United States Patent
Hoogerbrugge (10) Patent No.: US 11,126,432 B2
(45) Date of Patent: Sep. 21, 2021

(54) COMPUTER PROCESSOR AND METHOD WITH SHORT FORWARD JUMP INSTRUCTION INHIBITING

(75) Inventor: Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 1101 days.

(21) Appl. No.: 13/021,683

(22) Filed: Feb. 4, 2011

(65) Prior Publication Data

US 2011/0258423 A1    Oct. 20, 2011

(30) Foreign Application Priority Data

Feb. 11, 2010  (EP) ...................................... 10153346

(51) Int. Cl.
*G06F 9/30* (2018.01)
*G06F 9/38* (2018.01)
*G06F 21/52* (2013.01)
*G06F 21/72* (2013.01)

(52) U.S. Cl.
CPC ........ *G06F 9/30058* (2013.01); *G06F 9/3017* (2013.01); *G06F 9/30069* (2013.01); *G06F 9/3859* (2013.01); *G06F 21/52* (2013.01); *G06F 21/72* (2013.01)

(58) Field of Classification Search
CPC . G06F 9/30058; G06F 9/30069; G06F 9/3859
USPC ................................................. 712/233, 234
See application file for complete search history.

(56) References Cited

U.S. PATENT DOCUMENTS 5,799,180 A * 8/1998 Shiell et al. .................. 712/234
5,838,961 A   11/1998 Smith
6,804,782 B1 * 10/2004 Qiu et al. ...................... 713/194
7,318,145 B1 *  1/2008 Stribaek et al. ............... 712/220
7,340,734 B1 *  3/2008 de Waal ......................... 717/159

(Continued)

FOREIGN PATENT DOCUMENTS

CN    1271434 A   10/2000
EP    1 347 374 A2  9/2003

(Continued)

OTHER PUBLICATIONS

Wikipedia Addressing Mode, Jan. 31, 2009, Wikipedia, pp. 1-14.*

(Continued)

*Primary Examiner* — Jyoti Mehta (57) ABSTRACT

A computer processor is provided which hides jump instructions, in particular condition jump instructions, from side-channels. The processor comprises a forward jump detector for detecting a forward jump instruction having a jump target location which lies ahead and a jump inhibitor for inhibiting an execution of the forward jump instruction. The computer processor is configured for executing at least one intermediate computer instruction located between the inhibited forward jump instruction and the jump target location. The processor further comprises a storage destination modifier for modifying the storage destination determined by the at least one intermediate computer instruction to suppress the effects of execution of intermediate instructions. Since the intermediate instruction is executed regardless of the forward jump instruction, the jump is hidden in a side-channel. Secret information, such as cryptographic keys, on which the forward jump may depend, is also hidden.

13 Claims, 4 Drawing Sheets

(56) References Cited

U.S. PATENT DOCUMENTS

| | | | |
|---|---|---|---|
| 2003/0182541 A1* | 9/2003 | Magoshi | G06F 9/3885 712/226 |
| 2004/0068643 A1 | 4/2004 | Dowling | |
| 2005/0268075 A1* | 12/2005 | Caprioli et al. | 712/239 |
| 2006/0117167 A1* | 6/2006 | Evrard et al. | 712/208 |
| 2007/0180541 A1 | 8/2007 | Shu et al. | |
| 2008/0040607 A1 | 2/2008 | Kaabouch et al. | |
| 2009/0327674 A1* | 12/2009 | Codrescu et al. | 712/241 |

FOREIGN PATENT DOCUMENTS

| | | | |
|---|---|---|---|
| WO | 2004/049153 | A2 | 6/2004 |
| WO | 2005/124506 | A2 | 12/2005 |

OTHER PUBLICATIONS

Smart Card Technology, Dec. 16, 2001, 3 pages, [retrieved from the internet on Sep. 28, 2016], retrieved from URL <cardwerk.com/smartcards/smartcard_technology.aspx>.*

Your Dictionary—Subroutine, Dec. 25, 2008, 2 pages, [retrieved from the internet on Sep. 29, 2016], retrieved from URL <www.yourdictionary.com/subroutine>.*

Gordon, Basic Operations: Loops, Conditionals, Sep. 2000, 5 pages, [retrieved from the internet on Sep. 28, 2016], retrieved from URL <courses.cs.washington.edu/courses/cse378/00au/ctomips2.pdf>.*

Tanenbaum, Structured Computer Organization, 1984, Prentice-Hall, Second edition, 5 pages.*

David Patterson and John Hennessy, Computer Architecture A Quantitative Approach, 1996, Morgan Kaufmann, Second edition, 3 pages.*

Internet: http://en.wikipedia.org/wiki/Power_analysis, Accessed (May 20, 2009).

Mangard, S., et al.: "Power Analysis Attacks, Springer," pp. 1-13, 167-197, (2007).

Extended European Search Report for European Patent Application No. 10153346.1 (dated Jul. 5, 2010).

Hollmann, H.D.L. et al.; "Protection of Software Algorithms Executed on Secure Modules;" Future Generation Computer Systems vol. 13, No. 1, pp. 55-63; Jul. 1, 1997.

May, David, et al. "Random Register Renaming to Foil DPA" Proceedings of the Third International Workshop on Cryptographic Hardware and Embedded Systems, CHES 2001, May 14-16, 2001, Paris, France.

* cited by examiner

COMPUTER PROCESSOR AND METHOD WITH SHORT FORWARD JUMP INSTRUCTION INHIBITING

CROSS-REFERENCE TO RELATED APPLICATIONS

This application claims the priority under 35 U.S.C. § 119 of European patent application no. 10153346.1, filed on Feb. 11, 2010, the contents of which are incorporated by reference herein.

FIELD OF THE INVENTION

The invention relates to a computer processor configured for executing a sequence of computer instructions, the processor comprising a jump handler for detecting in the sequence of computer instructions a jump instruction, the jump instruction determining a jump target location in the sequence, an execution unit for executing a computer instruction to obtain a data result, and a storage handler for storing the data result to a storage destination determined by the computer instruction.

The invention also relates to a method of executing a sequence of computer instructions, the method comprising detecting in the sequence of computer instructions a jump instruction, the jump instruction determining a jump target location in the sequence, executing a computer instruction to obtain a data result, and storing the data result to a storage destination determined by the computer instruction.

The invention also relates to a corresponding microcode program.

BACKGROUND OF THE INVENTION

Computer processors are involved in a variety of security applications. The security applications include commercial application connected with large financial interest. The computer processor processes confidential, proprietary information such as cryptographic keys, executable computer code, etc, typically stored in a memory connected or comprised in the computer processor. Examples include, banking applications wherein the computer processor is responsible for the authentication of money transfers and content distribution systems wherein the computer processor is responsible for restricting access to the content to subscribers to the distribution systems.

For example, content distribution may be done over a network comprising multiple set-top boxes. In each set-top box an computer processor, typically integrated in a smart card, comprises secret cryptographic keys and/or secret decrypting algorithms for decrypting content, e.g. music, movies, etc, and/or decrypting further cryptographic keys.

Computer processors used in smart cards are often used for security applications. For example, smart cards are used for banking application. The smart card may be used for verifying a Personal Identification Number (PIN), applying or verifying a digital signature, etc. Smart cards are also used in mobile phones, e.g., as a Subscriber Identity Module; and in set-top boxes.

Naturally, secret information processed by a computer processor, such as keys, must be kept confidential, since their exposure may lead to unauthorized access, unauthorized transactions, etc. Moreover, it is desirable to keep the operation of the application secret as much as possible.

Persons who try to manipulate computer processors, in particular smart cards, or use information contained thereon in an illegal and/or unauthorized manner will be referred to as 'attackers'. An attacker may receive an computer processor in the form of a smart card containing a memory, e.g., a Read-Only-Memory (ROM), e.g., in the field through the regular channel. For example, an attacker may receive a smart card as part of a regular content subscription for use in a set-top box, or they may receive a smart card containing a ROM as a regular customer of a bank intended for regular banking smart-card transactions.

Computer processors and the applications that they execute are protected against attackers with various counter measures. For example, the application may use various forms of cryptography, e.g. encryption, authentication codes, integrity checks, etc. The use of cryptography however generally relies on secret information. Once an attacker gains access to the secrets, he may be able to exploit the leaked secret. Unfortunately, it has turned out that computer processors are prone to leak information, including secret information, through so-called side-channels.

Side-channel information is information that can be obtained from the physical implementation of a security application, different from the information that can be obtained from the applications intended observable input-output behavior.

Example of side-channels include: timing information, power consumption, electromagnetic radiation, etc. Generally speaking if a side-channel is correlated with secret information processed by the computer processor, then access to the side-channel will leak some information related to the secret information. In particular, measuring the power consumed by a processor has turned out to contain much information related to the operation of the processor while it consumes the power.

We will refer to power consumption and electromagnetic radiation measurements together as a 'trace'.

In the art different proposals have been made to counter the problem of information leaking through side-channels. For example, United States Patent Application 2007/0180541 with title "Cryptographic architecture with instruction masking and other techniques for thwarting differential power analysis" discloses an apparatus and method for preventing information leakage attacks that utilize timeline alignment. The apparatus and method inserts a random number of instructions into an encryption algorithm such that the leaked information becomes harder to align in time to allow an attacker to break the encryption.

Given the ever increasing financial interests connected with the security of computer processors and in particular smart cards, the security of these devices becomes ever more critical. There is an interest in computer processors that have increased security properties.

SUMMARY OF THE INVENTION

Interpreting the power consumption becomes harder in the presence of inserted random instructions. Insertion of random instructions has its drawbacks however. When multiple measurements are made of the power consumption of the same processor executing the same application, it may become possible to recognize which instructions are real instructions (since they are present in all measurements) and which instructions are dummy instructions (since they are only present in one measurement). Moreover, if sufficiently many multiple measurements are averaged the dummy instructions tend to average out, while the real instructions remain.

It was an insight of the inventor that one instruction in particular tends to contribute most to the leaking of information: conditional jumps. Typically, one can recognize from a side channel if a jump was taken or not since the pattern in power consumption changes in dependence on the jump being taken or not. Even the timing of the operation will change at least somewhat, as the time an application takes will differ depending on the jump being taken or not. It is known that even a side-channel which produces as little information as total execution time may, after appropriate statistical analysis, reveal secret information to an attacker.

A computer processor configured for executing a sequence of computer instructions is proposed which reduces the information leaked from jumps considerably, if not completely. The processor comprises a jump handler for detecting in the sequence of computer instructions a jump instruction, the jump instruction determining a jump target location in the sequence, an execution unit for executing a computer instruction to obtain a data result, and a storage handler for storing the data result to a storage destination determined by the computer instruction. The computer processor comprises a forward jump detector for detecting whether the jump target location lies further in the sequence compared to a location in the sequence of the jump instruction. The computer processor comprises a jump inhibitor for inhibiting an execution of the jump instruction in dependency on the forward jump detector detecting that the jump target location lies further in the sequence compared to a location in the sequence of the jump instruction. The execution unit is configured for executing at least one intermediate computer instruction of the sequence of computer instructions, the intermediate computer instruction being located in the sequence of computer instructions in between the inhibited jump instruction and the jump target location. The computer processor comprises a storage destination modifier for modifying the storage destination determined by the at least one intermediate computer instruction.

A jump instruction which depends on secret information, i.e. a secret condition, is visible in side-channels. Depending on the secret condition the information leaked through the side-channel changes. Especially if multiple traces depending on different secret conditions can be compared, either directly or using statistical analysis the condition may be derived from the traces.

The computer processor like a regular processor is capable of executing a sequence of computer instructions. The sequence of instruction may contain jumps, which the processor is capable is executing using its jump handler, e.g., by modifying a program counter. Other computer instructions may produce a data result when they are executed. For example the instruction may add two numbers, or retrieve a value from a memory. Finally, a storage handler is capable of storing such a data result at some destination, e.g., at a memory address, a register, an output device etc.

The information leaked through jumps depending on a condition can be suppressed if the jump is a forward jump. The presence of forward jumps is detected by a forward jump detector. The forward jump detector can detect if a jump is a forward jump by comparing the jump target location to the location where the jump instruction itself is stored. Typically, if the memory address at which the jump instruction is stored is less than a jump location target, also expressed as a memory address, then the jump is a forward jump.

The computer processor comprises means to suppress the forward jump instruction using the jump inhibitor. If the jump is not taken regardless if the secret condition is true or not, the side channel caused by the jump no longer correlates with the secret condition. The inhibition of jumps is also referred to as suppression of the jumps. Depending on the architecture, suppressing a jump may be done by modifying the jump target location into the current value of the program counter or into the address of the next instruction.

The intermediate instructions in between the jump instruction and the jump target location are 'killed' by preventing them from updating the processor state. Preferably, intermediate instructions consume more or less the same power as they normally would. This is achieved since the only difference between an intermediate instruction after an inhibited jump and the same instruction if the jump is not taken because some required condition for the jump is false is its storage destination.

To ensure that the application running on the processor has the same effect when a forward jump is suppressed, a number of measures are taken.

As the processor continues to execute instructions the processor will at some point end up at the original jump target location. In this respect the application will have the same effect.

The effect that intermediate instructions may have on the application by storing a data result is counteracted by the storage destination modifier which changes the storage destination.

If the computer processor suppresses a forward jump, the effects of intermediate instructions are also suppressed. However, since the intermediate instructions are executed as usual the side channel will not be correlated to the secret condition. Although preferably, all intermediate instructions are executed, a noticeable reduction in correlation can be achieved if a number of instructions are executed.

An additional advantage of the countermeasure described herein, is that it may be transparent to an application programmer. Even applications produced by programmers who are unaware of security risks related to side channels, will leak less when executed on a computer processor according to the invention.

In an embodiment, the jump instruction is a conditional jump configured for causing a jump if a condition is fulfilled, and wherein the storage destination modifier is configured for not modifying the storage destination determined by the at least one intermediate computer instruction if the condition is not fulfilled.

Conditional jumps are especially prone to leaking the most information (in the detailed description we will give an example to show that suppressing non-conditional jumps may be advantageous as well.) By executing intermediate instructions regardless if the condition on which the jump depends is true or not it is avoided that the condition leaks from the processor via a side channel.

If the condition required for taking the jump is true and the jump is a forward jump, then the jump is not taken. Storage destinations of intermediate instructions after the inhibited jump are modified, until the computer processor reaches the jump target location. At that point execution continues as normal, in particular, storage destination are not modified anymore.

If the condition required for taking the jump is false, the jump is not taken either. Storage destinations of intermediate instructions after the conditional jump are not modified In an embodiment, the computer processor comprises a register file. The storage destination is determined by the intermediate computer instruction is a destination register in the register file. The storage destination modifier is configured for modifying the destination register into a predetermined dummy register. It is preferred if the register file contains an additional register reserved for this purpose which is hidden from the programmer. For example, a regular register file with 16 registers for use by an application could be extended with a $17^{th}$ register reserved as dummy register.

In an embodiment, the computer processor is connected to or comprises a memory. The storage destination determined by the intermediate computer instruction is a destination address in the memory. The storage destination modifier is configured for modifying the destination address into a predetermined dummy address.

One way to avoid that intermediate instruction influence the effects of the application is to route the storage of data results to dummy locations. Note that storing to a dummy register and/or to a dummy memory address produces almost exactly the same side-channels as storing to the regular register and/or address. It will require careful statistical analysis using many traces to make the difference in a single address visible, if it can be shown at all. Forcing an attacker from analyzing one or a few traces to analyzing a larger number of traces is considered an important advantage. The timing characteristics of writing to a dummy are the same as writing to the regular destination.

A drawback of the executing of intermediate instructions may be that the total execution time of the application may increase. It is noted that this increase is not as bad as it may seem since only forward jumps are inhibited. Most of the execution time of an application is spent on loops which are controlled with backward jumps. A conditional backward jump is taken or not is not taken as is usual in the art. One way to further avoid the performance decrease is to cap the number of intermediate instruction that are executed to a predetermined maximum. If the predetermined maximum has been reached the jump is executed as usual. In an alternative embodiment, the forward jump detector is further configured for detecting whether a difference in location between the jump target location and the location of the jump instruction is less than a predetermined small jump threshold. By only suppressing small forward jumps the added number of instruction remains small, and the time increase is modest. For example, the predetermined maximum or the predetermined small jump threshold may be set to 8. It is noted that a value corresponding to skipping 1 or 2 instructions already gives a security advantage in some situations, as shown in the examples in the detailed description. Profiling of the execution with various choices of these predetermined limits show what numbers are acceptable. Generally, the higher these numbers are chosen, the more protection against side-channel analysis is offered.

In an embodiment the processor comprises an input for configuring the predetermined maximum or the predetermined small jump threshold.

If the intermediate instructions happen to comprise a jump than taking this jump may affect the execution of the application considerably. This may be avoided in various ways. For example, the compiler can do an execution path analysis and mark forward jumps suitable for inhibition. The computer processor can then be configured to recognize the mark. Only jumps that do not cause jumps in their following intermediate instruction are marked for suppression. The compiler may also only mark jumps with jump targets that are below the predetermined maximum or the predetermined small jump threshold. The compiler may also only mark those jumps which depend on secret information. In an alternative embodiment, the jump inhibitor is further configured to inhibit execution of all further jump instructions being located in the sequence of computer instructions in between the inhibited jump instruction and the jump target location. This may be accomplished by setting a general no-jump flag, and resetting the flag once the jump target location is reached.

Similarly, the execution of the application may be affected if an interrupt occurs during the execution of the intermediate instructions. One way to solve this problem, is to save a state of the processor comprising a flag indicating if storage destinations are being rerouted or not and the jump target location. Alternatively, in an embodiment, the jump inhibitor is further configure to inhibit interrupts occurring during execution of intermediate computer instructions of the sequence of computer instructions located in the sequence of computer instructions in between the inhibited jump instruction and the jump target location. By suppressing interrupts altogether the interrupt problem is sidestepped. Especially, if the number of intermediate instructions that are executed is relatively small the effect of suppressing interrupts is not significant.

Preferably, the power consumption of a jump instruction is independent of its inhibition by the jump inhibitor. Preferably, the power consumption of storing a data result is independent from its storage destination. By avoiding the leakage of information at a comparatively small number of registers (e.g., program counter, address lines, register file), the power consumption of the whole of the intermediate instructions is hidden. In this way one can afford to use relatively expensive countermeasures that would be inapplicable to the whole of the computer processor. For example, a relatively large amount of noise could be added to the power consumption of these computer processor components.

In an embodiment, the execution unit is configured for executing all intermediate computer instructions of the sequence of computer instructions located in the sequence of computer instructions between the inhibited jump instruction and the jump target location.

By executing all of the intermediate instructions, the effect of the jump on the trace is minimized.

In an embodiment, the computer processor comprises a kill register. The jump inhibitor is configured to set the kill register to a difference in location between the jump target location and the location of the jump instruction on inhibiting the jump instruction. The execution unit is configured for decreasing the kill register upon executing an intermediate computer instruction. The storage destination modifier is configured for modifying the storage destination determined by the intermediate computer instruction if the kill register is positive.

For example, the kill register may be set to the difference between a memory address to which the jump instruction points, and a memory address on which the jump instruction is located. Alternatively, the jump suppression may be applied to relative jumps, in which the jump target location is expressed as a number of memory location to skip. The number of memory location to skip may be loaded into the kill register. Some computer processors, e.g., certain RISC processors, such as a MIPS processor, store each instruction in a predetermined number of memory locations. In those cases the kill register may be set to the number of instructions for which data result storage is to be rerouted. The jump instruction may itself refer to the number of instructions to skip, or the number may be calculated by dividing a memory address difference by the number of memory location per instruction. For example, if each instruction takes four memory locations, and the difference in memory addresses of the jump target location and the jump instruction itself is 8, then there are 2 intermediate instructions.

The processor, e.g., the execution unit, is configured for decreasing the kill register upon executing an intermediate computer instruction. Each intermediate instruction cases a decrease in the kill register so that it is zero when the computer processor, e.g., the program counter, reaches the jump target location.

A further aspect of the invention concerns a smart card comprising a computer processor according to the invention. As is noted above smart cards in particular are often used in sensitive applications. On the other hand, smart cards are more vulnerable, since an attacker has easy access to its side-channels. In particular, an attacker can use his smart card while measuring the smart card's power consumption, electromagnetic radiation, or its execution time. On the other hand, smart cards are under pressure to be produced at low costs. The countermeasures according to the invention may be implemented with comparatively few additional gates.

A further aspect of the invention concerns a method of executing a sequence of computer instructions. The method comprises detecting in the sequence of computer instructions a jump instruction, the jump instruction determining a jump target location in the sequence, executing a computer instruction to obtain a data result, and storing the data result to a storage destination determined by the computer instruction, The method further comprises detecting whether the jump target location lies further in the sequence compared to a location in the sequence of the jump instruction, inhibiting an execution of the jump instruction in dependency on the forward jump detector detecting that the jump target location lies further in the sequence compared to a location in the sequence of the jump instruction, executing at least one intermediate computer instruction of the sequence of computer instructions, the intermediate computer instruction being located in the sequence of computer instructions in between the inhibited jump instruction and the jump target location, and modifying the storage destination determined by the intermediate computer instruction.

A method according to the invention may be implemented on a computer as a computer implemented method, for example in the form of microcode, or in dedicated hardware, or in a combination of both. Executable code for a method according to the invention may be stored on a computer program product. Examples of computer program products include memory devices, optical storage devices, integrated circuits, servers, online software, etc.

In a preferred embodiment, the computer program comprises computer program code means adapted to perform all the steps of a method according to the invention when the computer program is run on a computer. Preferably, the computer program is embodied on a computer readable medium.

A computer processor is provided which hides jump instructions, in particular condition jump instructions, from side-channels. The processor comprises a forward jump detector for detecting a forward jump instruction having a jump target location which lies ahead and a jump inhibitor for inhibiting an execution of the forward jump instruction. The computer processor is configured for executing at least one intermediate computer instruction located between the inhibited forward jump instruction and the jump target location. The processor further comprises a storage destination modifier for modifying the storage destination determined by the at least one intermediate computer instruction to suppress the effects of execution of intermediate instructions. Since the intermediate instruction is executed regardless of the forward jump instruction, the jump is hidden in a side-channel. Secret information, such as cryptographic keys, on which the forward jump may depend, is also hidden.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

LIST OF REFERENCE NUMERALS 100 a computer processor
105 a program counter
110, 120, a pipeline register
130, 150,
160
115 an instruction cache
125 a register file
135 a destination register line
140 an execution unit
145 a jump handler
155 a data cache
165 a data cache bypass
170 an address line
175 a program counter update line
180 an operand value line
185 a register update line
190 a register value update line
210 a pre-pipeline stage
220 an instruction fetch stage
230 a decode stage
240 an execute stage
250 a memory access stage
252 a jump determinator
254 a forward jump determinator
256 a kill register
260 a destination address modifier
262 a destination register modifier
264 a jump inhibitor
300 a smart card
310 an integrated circuit
305 a supporting card
320 a computer processor
322 a memory
324 an accelerator
326 a communication element
330 a bus
400 a flow chart

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 1:
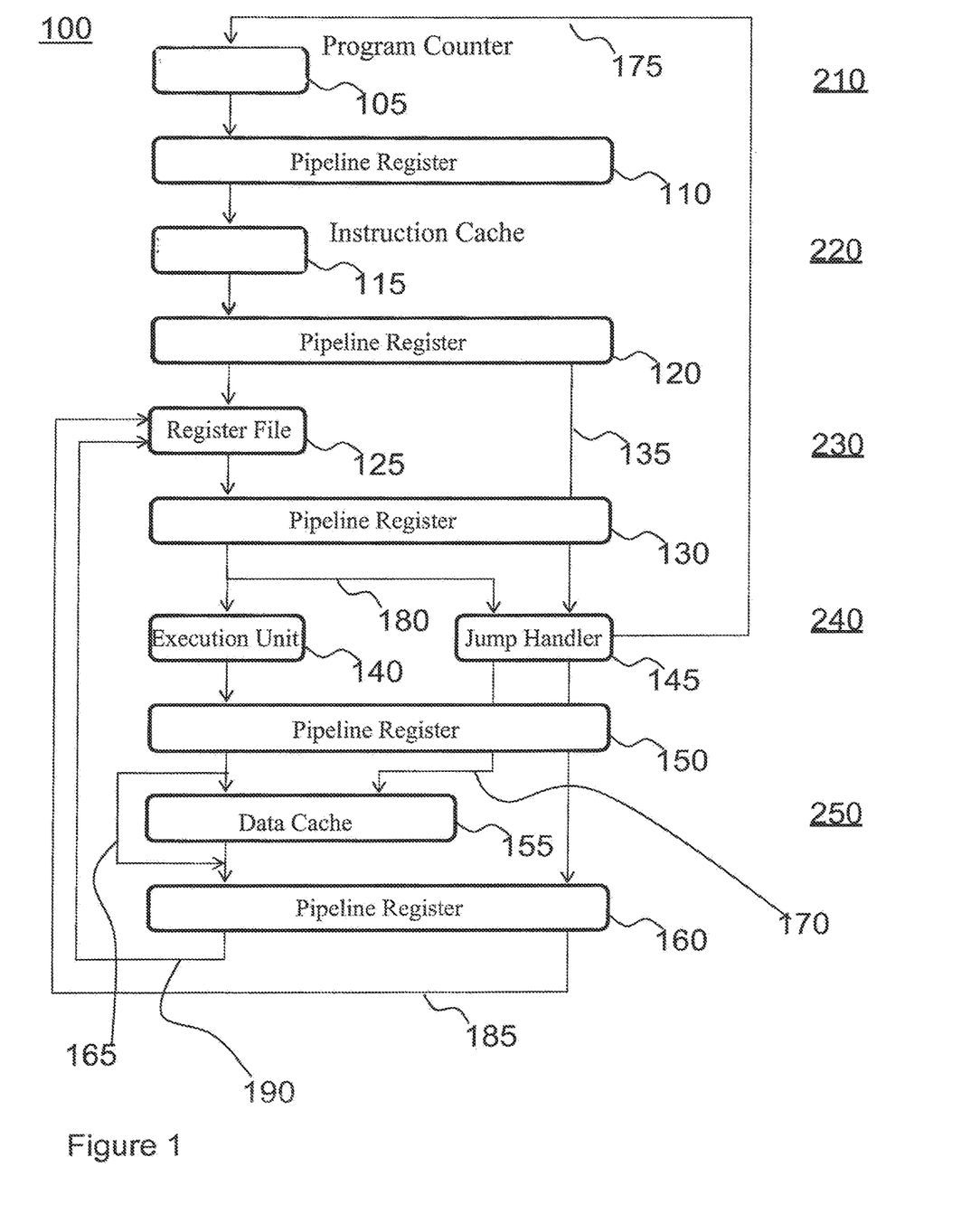
FIG. 1 is a block diagram illustrating a computer processor according to the invention.

FIG. 1 shows a computer processor according to the invention in schematic form. Some of the data dependencies are indicated with arrows. This embodiment uses a pipelined implementation using 5 stages. The invention may also be applied without using a pipeline, or with more or fewer stages.

FIG. 1 further shows, in order, a stage 210, an instruction fetch stage 220, a decode stage 230, an execute stage 240, and a memory access stage 250. This is also the order in which an instruction during normal operation progresses through the stages. Stage 210 comes before the proper stages of the pipeline. Stage 210 is sometime referred to as 'stage 0'.

In between the stages are pipeline registers 110, 120, 130, 150, 160. The pipeline registers are inserted in-between pipeline stages, and are clocked synchronously. The time between each clock signal is set to be greater than the longest delay between pipeline stages, so that when the registers are clocked, the data that is written to them is the final result of the previous stage. A computer processor according to the invention may omit pipeline registers, e.g., using asynchronous logic.

FIG. 1 shows for each pipeline stage one or more components which are beneficial for an understanding of the invention. It is understood that an embodiment may comprise more components such as is conventional in the art of computer processors. The distribution of components over the various stages may be varied. Functionality shown in one stage may be moved to a different stage or distributed over multiple stages.

Stage 210 shows a program counter 105. Program counter 105 is connected via pipeline register 110 to instruction fetch stage 220. Instruction fetch stage 220 comprises an instruction cache 115. Instruction cache 115 is connected to decode stage 230 via pipeline register 120. Decode stage 230 comprises a register file 125. Register file 125 is connected to execute stage 240 via pipeline register 130. Execute stage 240 comprises an execution unit 140 and a jump handler 145. Jump handler 145 is connected to program counter 105 via program counter update line 175. Execution unit 140 and jump handler 145 are connected to memory access stage 250 via pipeline register 150. Memory access stage 250 comprises a data cache 155. Jump handler 145 is adapted to forward storage destinations from pipeline register 130 to memory access stage 250. Data cache 155 is connected to pipeline register 160. Pipeline register 160 is connected to register file 125 for writing data results produced be computer processor 100, in particular execution unit 140 or data cache 155 to a register. Execution unit 140 may comprise an ALU.

Computer processor 100 comprises a storage handler. The storage handler is implemented by data cache 155, through which values may be written to a memory, and bypass 165, and lines 185 and 190, through which values may be written to register file 125.

Computer processor 100 comprises a storage handler. The storage handler is implemented by data cache 155, through which values may be written to a memory, and bypass 165, and lines 185 and 190, through which values may be written to register file 125.

During operation, computer processor 100 operates as follows. The program counter determines the next instruction that computer processor 100 is to fetch and execute. The program counter is connected through pipeline register 110 with the instruction fetch stage 220. Instruction fetch stage 220 comprises an instruction cache 115. Program counter 105 indicates the instruction which is to be retrieved from instruction cache 115. A next instruction is obtained and retrieved for instruction cache 115, e.g., by using a program counter predictor. Retrieving a next instruction for instruction cache 115 may be done in parallel.

The instruction obtained in instruction fetch stage 220 is decoded and forwarded to decode stage 230 via pipeline register 120. In instruction fetch stage 220 the instruction is portioned into register operand specifiers, indicating which registers contain data on which later components are to act and/or optionally a register destination indicating a register to which result data is to be written.

Register operand specifiers obtained from the instruction are forwarded via pipeline register 120 to register file 125 which is comprised in decode stage 230. Register file 125 is configured to receive as input register operand specifiers and to produce operand values as output corresponding to the specified registers. A register destination is forwarded via a destination register line 135 to jump handler 145.

Jump handler 145 also receives from register file 125 via pipeline register 130 and operand value line 180 the operand values. Computer processor 100 may be configured to forward the operand value to jump handler 145 only in case the operand values contain a target address, either as a jump target location, or as a destination address.

Jump handler 145 determines if a jump must be taken, either because the jump is unconditional or because the jump is conditional and the condition is true. If jump handler 145 is configured for normal operation, it will update program counter 105 via program counter update line 175 connecting jump handler 145 with program counter 105. In that case, addresses forwarded to jump handler 145 via operand value line 180 or destination registers forwarded to jump handler 145 via destination register line 135 are not modified.

However, if jump handler 145 is configured according to the invention, jump handler 145 will determine if the jump must be inhibited. Jump handler 145 will determine if the jump is a forward jump suitable for inhibition. In particular jump handler 145 may test to see if the forward jump is a small jump, e.g., less than 5 instruction forward. If the jump is to be inhibited, jump handler 145 will not modify program counter 105. For example, jump handler 145 may overwrite program counter 105 with the next address which is to be executed. This option is appropriate if the program counter will not be modified after the jump handler. For example, jump handler 145 may overwrite program counter 105 with its current value. This option is appropriate if the program counter will be updated later in the pipeline.

Target addresses coming through jump handler 145 are modified into a predetermined dummy memory address. Destination registers coming through jump handler 145 are modified into a predetermined dummy register. One of the registers of register file 125 is reserved as dummy register. One of the memory locations indicated by the dummy addresses in a memory connected or connectable to computer processor 100 is reserved as a dummy memory location. Jump handler 145 may select from multiple dummy addresses and/or registers, e.g., at random or cyclically, etc, to further hide the jump in a trace. Jump handler 145 is further described in FIG. 2.

Execution unit 140 is connected to pipeline register 130 to receive the operand values from register file 125. Execution unit 140 performs an operation producing a data result, e.g., a calculation. The result is forwarded via pipeline register 150 to memory access stage 250. In memory access stage 250 the data result is stored. If the data result is to be forwarded to memory, the data result is send to data cache 155. Data cache 155 receives a destination memory address from jump handler 145. If the data result was produced by an intermediate instruction, the memory address has been modified by jump handler 145. If the data result is produced by an ordinary non-intermediate instruction, the memory address has not been modified. If the data result is to be written to a register instead of to a memory address, data cache 155 is bypassed, via data cache bypass 165. The data result is forwarded to register file 125 via a register value update line 190 together with a destination register coming from jump handler 145 via pipeline register 150 and pipeline register 160, via register update line 185.

Figure 2:
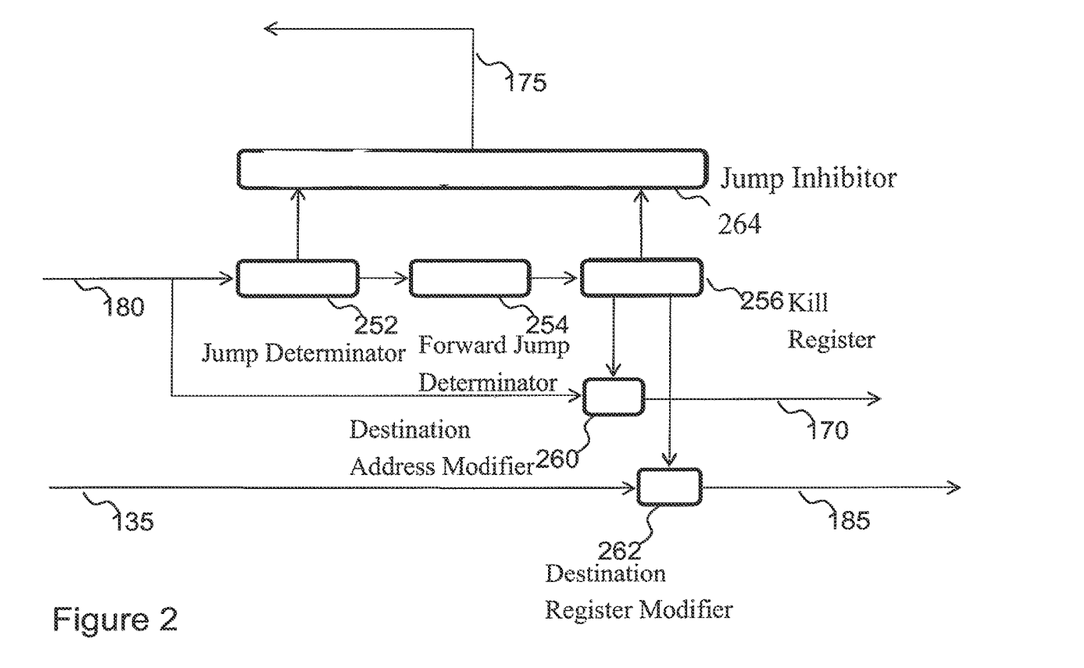
FIG. 2 is block diagram illustrating a jump handler.

FIG. 2 is block diagram illustrating a jump handler which may be used in the embodiment shown in FIG. 1. Jump handler 145 receives as input operand values via operand value line 180 and a destination register via destination register line 135. Jump handler 145 comprises a jump determinator 252 connected to operand value line 180, a forward jump determinator 254 connected to jump determinator 252, a kill register 256 connected to forward jump determinator 254. Jump handler 145 comprises a destination address modifier 260 and a destination register modifier 262. Jump handler 145 also comprises a jump inhibitor 264. Jump determinator 252 may also be referred to as jump determination unit 252.

In operation, jump determinator 252 determines if a jump is to be taken. If a jump is to be taken jump determinator 252 sends a signal to jump inhibitor 264 for forwarding to program counter 105 via program counter update line 175. Jump inhibitor 264 may block the forwarding of the jump signal. The jump signal comprises the jump target location, e.g., a target memory address from which the next instruction is to be executed. Jump instructions may also be inhibited by replacing the target program counter by the program counter of the next instruction. The latter option has the advantage that the power consumption of a jump instruction becomes less dependent on whether the jump was taken or not.

Forward jump determinator 254 receives a signal from jump determinator 252 if a jump instruction is detected. Forward jump determinator 254 determines if the jump is suitable for suppression. For example, forward jump determinator 254 determines the difference between the target jump location and the location of the current jump instruction. If the difference is positive, indicating that it is a forward jump, and if the difference small, forward jump determinator 254 may determines that the jump is to be inhibited. Note that other criteria may be followed. For example, forward jump determinator 254 may look for a flag associated to the jump instruction by a compiler indicating suitability. If a jump is to be inhibited, forward jump determinator 254 set a kill register 256 to the difference. If the difference is positive destination addresses are changed and further jumps are suppressed. Forward jump determinator 254 may also be referred to as forward jump detector 254.

A difference may be expressed as a number of memory location, i.e. memory addresses, or as a number of instructions.

Jump inhibitor 264 is connected to jump determinator 252 to receive a jump signal and an indication of a jump target location. Jump inhibitor 264 is also connected to kill register 256 to receive an indication if the kill register is positive and thus that the jump is to be suppressed. Note that both an initial jump and any jump in between the initial jump and its jump target location are suppressed, but only the initial jump sets the kill register 256. That is if the kill register is not yet zero, it is not set.

Kill register 256 is also connected to destination address modifier 260 and destination register modifier 262. The destination address modifier 260 receives a destination address from operand value line 180. If kill register 256 is positive destination address modifier 260 modifies the destination address, e.g., by changing it to a dummy address. The destination address, possibly in modified form, is then forwarded via address line 170 to data cache 155 through pipeline register 150. Destination register modifier 262 receives a destination register from destination register line 135. If kill register 256 is positive destination register modifier 262 modifies the destination register, e.g., by changing it to a dummy register. Destination register modifier 262 forwards the destination register, possibly in modified form, to register update line 185. The destination address is routed, through pipeline register 150, and pipeline register 160 to register file 125.

In this embodiment the address line indicating a destination address line and a destination register line indicating a destination register are routed through the jump handler 145. This is not necessary, instead a destination address modifier 260 may be placed in memory access stage 250, and an inhibition signal may be forwarded from kill register 256 to destination address modifier 260. Similarly, destination register modifier 262 may be placed in memory access stage 250 or even in register file 125.

It is noted that the invention may be distributed over the pipelines in different ways. For example, jump determinator 252 may be placed in decode stage 230. In that case execute stage 240 may receive a jump signal indicating a jump target location from execute stage 240. In that case execute stage 240 does not need to evaluate a conditional as this is already done in decode stage 230. Forward jump determinator 254 and kill register 256 may then be placed in decode stage 230 or in execute stage 240.

Figure 3A:
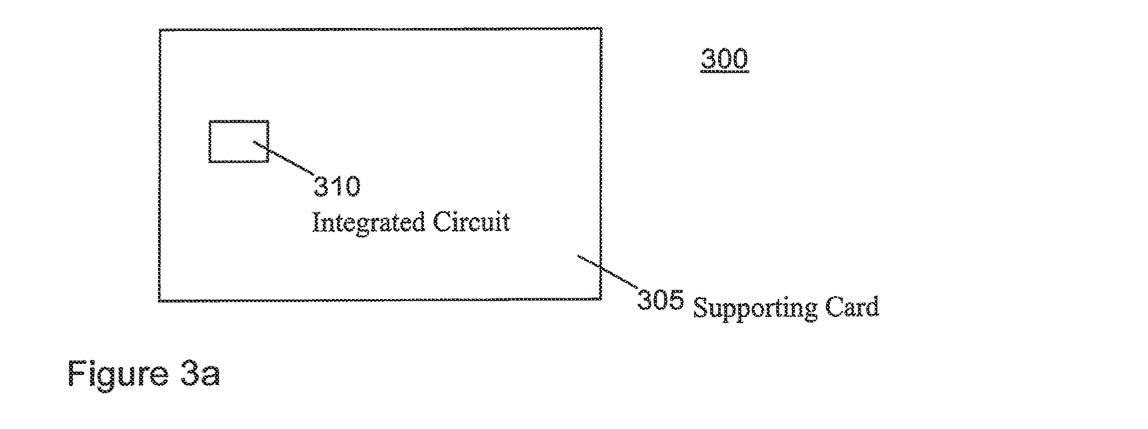
FIG. 3a shows a schematic top-view of a smart card.
Figure 3B:
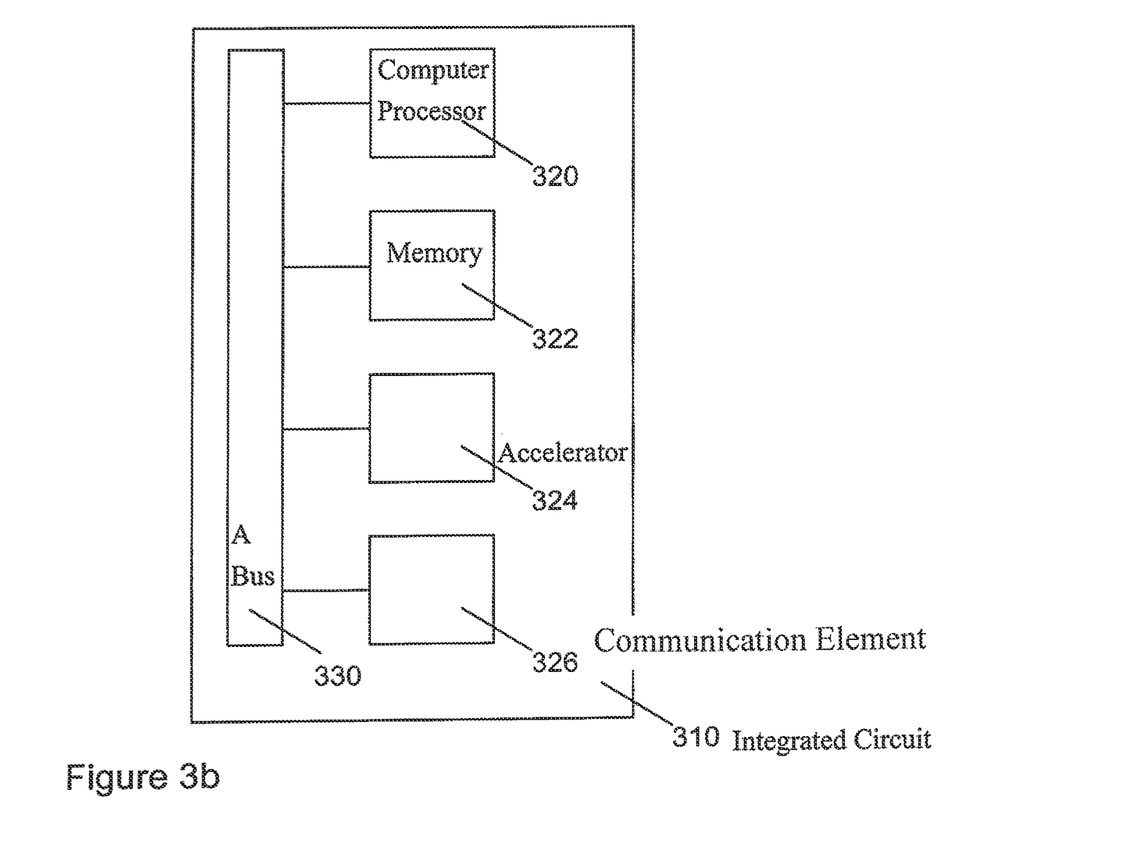
FIG. 3b is a block diagram illustrating an integrated circuit.

A computer processor according to the invention may be used in a computer system comprising a computer processor and a memory connected to each other via a bus. For example, FIG. 3a shows in top-view a schematic representation of a smart card 300 according to the invention. The smart card comprises an integrated circuit 310 and a, typically plastic, supporting card 305 supporting integrated circuit 310. The architecture of integrated circuit 310 is schematically shown in FIG. 3b. Circuit 310 comprises a computer processor 320, e.g. a CPU, for running computer program components, including those stored in encrypted form. Circuit 310 comprises a memory 322 for storing programming code, data, cryptographic keys, etc. Part of memory 322 may be read-only. Circuit 310 may comprise a coprocessor 324, e.g., for accelerating cryptographic operations. Circuit 310 may comprise a communication element 326, e.g., an antenna, connector pads or both. Computer processor 320, memory 322, accelerator 324 and communication element 326 may be connected to each other via a bus 330. The card may be arranged for contact and/or contact-less communication, using an antenna and/or connector pads respectively. The smart card may be used, e.g., in a set-top box to control access to content, in a mobile phone to control access to a telecommunication network, in a public transport system to control access to public transport, in a banking card to control access to a bank account, etc.

Figure 4:
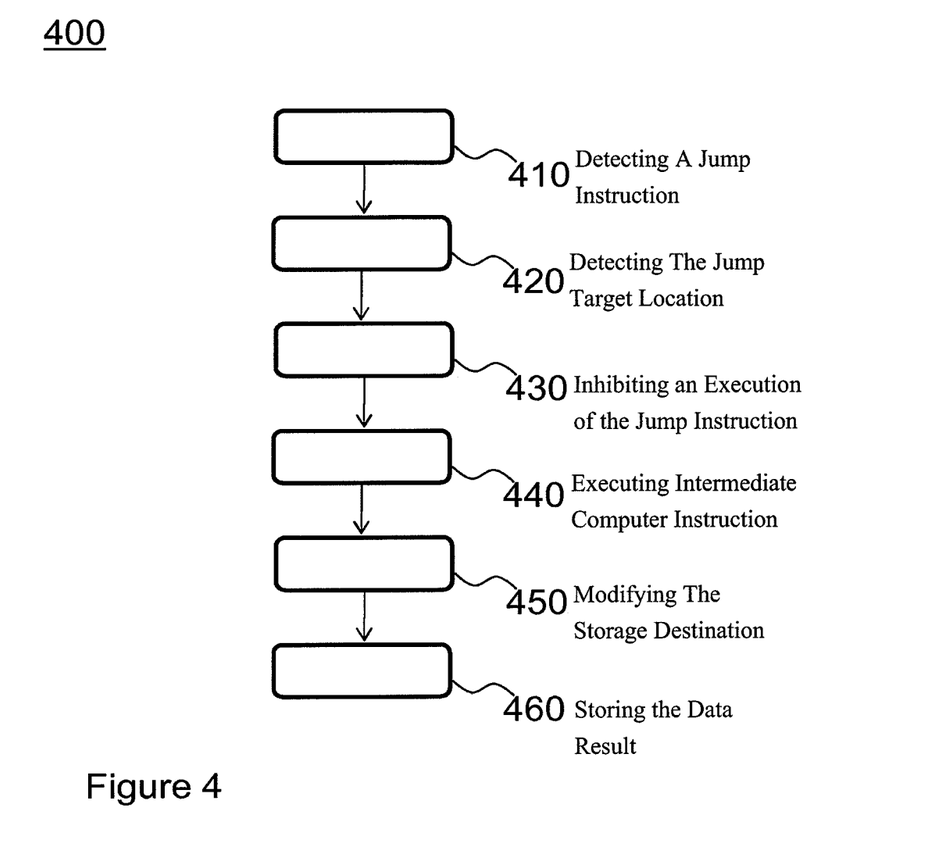
FIG. 4 is a flow chart illustrating a method according to the invention.

FIG. 4 shows a method 400 according to the invention in the form of a flow chart. The flowchart indicates with arrows one possible order of the method.

Step 410 comprises detecting in a sequence of computer instructions a jump instruction, the jump instruction determining a jump target location in the sequence.

Step 420 comprises detecting whether the jump target location lies further in the sequence compared to a location in the sequence of the jump instruction.

Step 430 comprises inhibiting an execution of the jump instruction in dependency on the forward jump detector detecting that the jump target location lies further in the sequence compared to a location in the sequence of the jump instruction.

Step 440 comprises executing at least one intermediate computer instruction of the sequence of computer instructions to obtain a data result, the intermediate computer. instruction being located in the sequence of computer instructions in between the inhibited jump instruction and the jump target location.

Step 450 comprises modifying the storage destination determined by the intermediate computer instruction.

Step 460 comprises storing the data result to the storage destination.

Preferably the method is implemented on a computer processor in the form of microcode. A computer processor configured for receiving updates may be configured for the invention by receiving a microcode update configured for a method according to the invention.

Many different ways of executing the method are possible, as will be apparent to a person skilled in the art. For example, the order of the steps can be varied or some steps may be executed in parallel. Moreover, in between steps other method steps may be inserted either. The inserted steps may represents refinements of the method such as described herein, or may be unrelated to the method. For example, steps 430 and 440 may be executed, at least partially, in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example, processor instructions and/or interpreter instructions. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Furthermore, the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

Below two examples are described, further illustrating the invention.

Power analysis attacks use current measurements to obtain secret information processed in integrated circuits, e.g., secret keys in smart cards. In the case of programmable processors, conditional jump instructions (also called branches), where the condition is based on secret information, are of great interest to an attacker.

An example of this is the modular exponential computation that is part of the RSA algorithm. The RSA algorithm is used with a secret key in public key decryption and signature generation. The exponentiation function can be written in pseudo code as follows:

```
x = m;
for(i = n - 2 down to 0)
{
    x = x * x;
    if (bit i of key is set)
        x = x * m;
}
return x;
```

In this example, m is the so-called message. An exponentiation is computed with the message as the base and the secret key as the exponent. In dependence on secret information, a multiplication with the message is performed. Whether or not a multiplication is performed is visible in a side-channel. In the current traces it is relatively easy to identify the iterations of this loop. Furthermore, it also relatively easy to observe two types of iterations: one where bit i of the key is set and one where it is zero. This is because in the first case the iteration takes longer and consumes more power due to the second multiply. Therefore, with a current trace it is relatively easy to obtain the secret key.

If the algorithm compiled the assembly code for the loop might look as follows:

```
L2:     mul x, x, x
        tst c, i, key
        jmpc c, L1 <<< this is the jump that we want to hide
        mul x, x, m
L1:     dec i
        jmpnz i, L2
```

Here L1 and L2 are labels which may be the target of a jump instruction. In the first line, x is squared. In the second line a register c is set to the value of bit i of the key. Depending on the conditional a jump is or is not taken. If the jump is not taken an additional multiplication is performed. Note that the jump is a short distance forward jump that jumps over one instruction, i.e., over the second multiply.

If the jump indicated in the above were inhibited according to the invention, then the multiplication following the jump (the jmpc instruction) would always be performed, regardless of the value of the conditional. However the writing to register x would be replaced by writing to a dummy variable. The power consumption of intermediate instructions, such as the multiplication with the message, is as if the jump would not have been taken and the instructions would have been executed. When the computer processor arrives at L1, the computer code is further executed as usual.

As a result of the using a computer processor according to the invention the correlation between side-channels of the processor and information on which jumps depends, in particular secret information, is reduced.

A programmer who is well aware of security issues might himself have realized that the shown algorithm leaks information rewrite the code. However, at many places there are conditionals and it is not always straightforward if a conditional would leak information. For example, in the pin code example shown below, the code was intentionally written to reduce information leakage through power consumption, nevertheless that algorithm still leaks information.

Conditional jumps that make a short jump forward in the code, e.g., less than 8 instructions may be hidden according to the invention thereby significantly reducing the leakage of information through side-channels.

Detecting of short distance forward jumps is particularly efficient if the processor architecture has relative branches, which is what many architectures provide. It is therefore an option to restrict jump inhibition to relative branches.

Besides for conditional jumps it may also be advantageous to apply the invention to unconditional jumps.

Consider, for example, the following pseudo code, representing an if-then-else construction followed by other code, the continuation code.

```
if (secret condition)
    T; // 'then code'
else
    E; // 'else code'
C; // 'continuation code'
```

This translates into the following assembly code:

```
        jmpc c, L1 // secret condition
        E // 'else code'
        jmp L2
L1:     T // 'then code'
L2:     C // 'continuation code'
```

In this example, the variable c contains the condition. If we apply the invention to the unconditional jumps as well (jmp L2 in the code above), as well as to the conditional jump at the top then we have the situation that the attacker will always observe the power consumption of both the then code (T) and the else code (E) independent of the value of the secret condition.

Note that the invention may be applied without the need of making modifications to the computer processor's instruction set or its compiler. On the other hand, a compiler may be configured to reorder the generated code such that it maximizes the number of jumps which may be inhibited, i.e., small forward jumps.

Alternatively, a programmer could annotate his source code with directives that instruct the compiler to generate short distance forward jumps for the code for which the directive applies, if possible. In this way the programmer can control when it is worthwhile to reduce performance for increased security and when it is not.

Below we describe a second example, which shows an advantage of the invention. The assembly code below compares an entered PIN code with a stored PIN code. Note that the same example applies to any password comparison routine, e.g., for authentication procedures, e.g., for use in entrance control.

```
        move i, 1              // init counter
        move fail, 0           // init fail
loop:   load p, pincode[i]     // load pincode digit
        load e, entered[i]     // load entered digit
        cmp c, p, e            // compare digits
        beq c, skip            // skip next instr if equal
        move fail, 1           // set fail = true
skip:   add i, i, 1            // increment counter
        cmp c, i, 4            // more digits?
        bne loop
// fail tells whether pincode verification failed.
```

In the example, the code loops over the entered PIN code (the array entered[ ]) and compares it successively with a pincode stored in a memory accessible by the computer processor (the array pincode[ ]). If a difference is found between the entered pincode and the stored pincode a flag fail is set to 1. If no differences are found the flag fail remains 0.

At first glance it may seem that the code does not leak any information to an attacker. For example, regardless whether the pincode is correct or not, all iterations are always performed. This was done to reduce the correlation between a trace and the stored pincode. However, the beq (branch equal) on line 6 still leaks information. By observing in the trace if that jump is taken or not, it is leaked which entries of the entered pincode array are incorrect.

An attacker may exploit this information. For example, if he knows the first entry is incorrect he may try to change the first entry of a next entered pincode until the side-channel indicates that he has found the correct value of the first entry. Once he knows the first entry he may vary the next entry of the pincode which is incorrect. In this way the number of tries needed to obtain the correct pincode is significantly reduced compared to the situation in which an attacker would find himself without having access to side-channels. Without side-channels all combination of all entries of the entered pin code must be varied together over all combination instead of finding the correct entries independent of one another.

When the code above is run on a computer processor according to the invention the leakage problem is solved. Regardless of an entry is correct or not, the move operation will be performed. If the entry was false a move fail, 1 will be executed as usual. If the entry was correct, a move dummy, 1 will be executed. The dummy may be a dummy register or a dummy address.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer processor configured for executing a sequence of computer instructions, the computer processor comprising
   a jump handler configured to determine whether a jump instruction in the sequence of computer instructions is to be taken and whether the jump instruction is to be inhibited, the jump instruction determining a jump target location in the sequence of computer instructions;
   execution circuitry configured for executing a computer instruction to obtain a data result;
   a storage handler configured for storing the data result to a storage destination determined by the computer instruction;
   a forward jump detector configured for determining whether the jump target location lies further in the sequence of computer instructions compared to a location in the sequence of computer instructions containing the jump instruction, and determining a jump condition based on a number of instructions ahead at which the jump target location lies;
   a jump inhibitor configured for inhibiting an execution of the jump instruction in dependency on the forward jump detector detecting that the jump target location lies further in the sequence of computer instructions compared to the location in the sequence of computer instructions including the jump instruction, wherein the jump inhibitor inhibits execution of the jump instruction by blocking forwarding of a jump signal sent to the jump inhibitor by a jump determinator of the jump handler, wherein the jump handler detects that the jump instruction is a conditional jump instruction, and wherein the conditional jump instruction depends on secret information, and wherein jump inhibition is restricted to relative branches of processor architecture; and
   a storage destination modifier configured for modifying the storage destination in response to the jump condition being satisfied by the number of instructions ahead at which the jump target location lies and for modifying a storage destination for intermediate computer instructions located in the sequence of computer instructions in between the jump instruction and the jump target location in response to inhibition of the jump instruction,
   wherein each of the jump handler, the storage handler, the forward jump detector, the jump inhibitor and the storage destination modifier is a subroutine stored in a non-transitory memory as computer instructions executable by the computer processor, and wherein the computer instructions are executed by the computer processor to perform respectively recited, aforesaid functions corresponding to the jump handler, the storage handler, the forward jump detector, the jump inhibitor and the storage destination modifier.

2. The computer processor as in claim 1, comprising a register file, wherein the storage destination determined by the computer instruction is a destination register in the register file, and wherein the storage destination for the intermediate computer instructions is modified in response to a determination that the number of instructions ahead at which the jump target location lies is less than eight instructions, wherein the jump handler is configured and arranged to not modify a program counter value in response to the inhibition of the execution of the jump instruction.

3. The computer processor as in claim 1, wherein the forward jump detector is further configured for detecting whether a difference in location between the jump target location and a location of the jump instruction is less than a predetermined small jump threshold.

4. The computer processor as in claim 1, wherein the jump inhibitor is further configured to inhibit execution of all further jump instructions being located in the sequence of computer instructions in between the inhibited jump instruction and the jump target location.

5. The computer processor as in claim 1, wherein the jump inhibitor is further configured to inhibit interrupts occurring during execution of at least one intermediate computer instruction located in the sequence of computer instructions in between the inhibited jump instruction and the jump target location.

6. The computer processor as in claim 1, wherein power consumption of a jump instruction is independent of its inhibition by the jump inhibitor.

7. The computer processor as in claim 1, wherein the execution circuitry is configured for executing all intermediate computer instructions located in the sequence of computer instructions between the inhibited jump instruction and the jump target location.

8. A smart card comprising the computer processor as in claim 1.

9. The computer processor as in claim 1 further comprising a kill register, wherein the kill register is set to a difference in location between the jump target location and the location of the jump instruction on inhibiting the jump instruction, wherein the execution circuitry is configured and arranged for decreasing the kill register value upon executing an intermediate computer instruction, wherein the kill register is zero when the computer processor reaches the jump target location.

10. The computer processor as in claim 1, wherein the execution circuitry is further configured to:
   execute at least one intermediate computer instruction located in the sequence of the computer instructions in between the inhibited jump instruction and the jump target location in response to inhibition of the execution of the jump instruction, and modify a storage destination for the at least one intermediate instruction in response to the forward jump detector determining the jump condition based on the number of instructions ahead at which the jump target location lies being less than a predetermined small jump threshold.

11. A non-transitory computer readable medium having computer instructions stored thereon, wherein when executed by a computer processor, the computer instructions cause the computer processor to perform operations comprising:
determining whether a jump instruction in a sequence of computer instructions is to be taken and whether the jump instruction is to be inhibited, the jump instruction determining a jump target location in the sequence of computer instructions;
executing a computer instruction to obtain a data result, the computer instruction being located in the sequence of computer instructions between the jump instruction and the jump target location;
storing the data result to a storage destination determined by the computer instruction, wherein the storage destination is a destination address in a memory;
determining whether the jump target location lies further in the sequence of computer instructions compared to a location in the sequence of computer instructions containing the jump instruction, and determining a jump condition based on a number of instructions ahead at which the jump target location lies;
inhibiting an execution of the jump instruction in dependency on detecting that the jump target location lies further in the sequence of computer instructions compared to the location in the sequence of computer instructions including the jump instruction, wherein a jump inhibitor inhibits execution of the jump instruction by blocking forwarding of a jump signal sent to the jump inhibitor by a jump determinator of a jump handler, wherein the jump instruction depends on secret information, and wherein jump inhibition is restricted to relative branches of processor architecture; and
modifying the storage destination in response to the jump condition being satisfied by the number of instructions ahead at which the jump target location lies and modifying a storage destination for intermediate computer instructions located in the sequence of computer instructions in between the jump instruction and the jump target location in response to inhibition of the jump instruction.

12. A computer processor configured for executing a sequence of computer instructions, the computer processor comprising:
a jump handler configured to determine whether a jump instruction in the sequence of computer instructions is to be taken and whether the jump instruction is to be inhibited, the jump instruction determining a jump target location in the sequence of computer instructions;
a forward jump detector configured for determining whether the jump instruction in the sequence of computer instructions includes a forward jump by determining if the jump target location lies further in the sequence of computer instructions compared to a location in the sequence of computer instructions containing the jump instruction, and determining a jump condition based on a number of instructions ahead at which the jump target location lies;
a jump inhibitor configured for inhibiting an execution of the jump instruction responsive to the forward jump detector determining that the jump target location lies further in the sequence of computer instructions compared to the location in the sequence of computer instructions including the jump instruction, wherein the jump inhibitor inhibits execution of the jump instruction by blocking forwarding of a jump signal sent to the jump inhibitor by a jump determinator of the jump handler, wherein jump inhibition is restricted to relative branches of processor architecture, and wherein the jump instruction depends on secret information;
execution circuitry configured for executing the jump instruction responsive to the determination that the jump instruction includes the forward jump to the jump target location that lies further in the sequence of computer instructions and within a number of computer instructions and for executing a computer instruction to obtain a data result;
a storage handler configured for storing the data result to a storage destination determined by the computer instruction; and
a storage destination modifier configured for modifying the storage destination in response to the jump condition being satisfied by the number of instructions ahead at which the jump target location lies and for modifying a storage destination for intermediate computer instructions located in the sequence of computer instructions in between the jump instruction and the jump target location in response to inhibition of the jump instruction,
wherein each of the jump handler, the forward jump detector, the jump inhibitor, the storage handler, and the storage destination modifier is a subroutine stored in a non-transitory memory as computer instructions executable by the computer processor, and wherein the computer instructions are executed by the computer processor to perform respectively recited, aforesaid functions corresponding to the forward jump detector and the jump inhibitor.

13. The computer processor as in claim 12, wherein the execution circuitry is further configured to:
cause execution of intermediate computer instructions located in the sequence of computer instructions in between the inhibited jump instruction and the jump target location in response to execution of the jump instruction.

* * * * *